(12) United States Patent
Ogura et al.

(10) Patent No.: US 8,411,544 B2
(45) Date of Patent: Apr. 2, 2013

(54) OPTICAL DISC REPRODUCTION APPARATUS

(75) Inventors: Youichi Ogura, Osaka (JP); Noriyuki Masunari, Osaka (JP); Yorikazu Takao, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/251,874

(22) Filed: Oct. 3, 2011

(65) Prior Publication Data

US 2012/0026850 A1 Feb. 2, 2012

Related U.S. Application Data

(63) Continuation of application No. PCT/JP2009/006558, filed on Dec. 2, 2009.

(30) Foreign Application Priority Data

Apr. 2, 2009 (JP) .................................. 2009-089744

(51) Int. Cl.
G11B 7/00 (2006.01)
(52) U.S. Cl. ................ 369/53.34; 369/53.12; 369/44.32
(58) Field of Classification Search ................ 369/53.1, 369/53.11, 53.12, 53.2, 53.35, 53.41, 44.32, 369/53.34
See application file for complete search history.

(56) References Cited

U.S. PATENT DOCUMENTS

| 6,285,647 | B1 * | 9/2001 | Van Woudenberg et al. . 369/116 |
| 6,381,203 | B1 * | 4/2002 | Muramatsu ................ 369/47.17 |
| 2003/0043718 | A1 * | 3/2003 | Minamino et al. ......... 369/59.25 |
| 2005/0018578 | A1 | 1/2005 | Ogura et al. |
| 2006/0007828 | A1 * | 1/2006 | Kadowaki et al. ......... 369/53.12 |
| 2006/0208766 | A1 * | 9/2006 | Ogura et al. ..................... 327/12 |
| 2006/0239655 | A1 | 10/2006 | Ogura et al. |
| 2008/0159104 | A1 * | 7/2008 | Miyashita et al. ......... 369/53.41 |

FOREIGN PATENT DOCUMENTS

| JP | 05-211446 | 8/1993 |
| JP | 2005-032414 | 2/2005 |
| JP | 2006-216187 | 8/2006 |
| JP | 2006-252645 | 9/2006 |
| WO | WO 2008/044503 A1 | 4/2008 |

* cited by examiner

*Primary Examiner* — Thomas Alunkal
(74) *Attorney, Agent, or Firm* — McDermott Will & Emery LLP

(57) ABSTRACT

An instantaneous jitter information detection section detects, based on first and second digital values indicating different polarities relative to a predetermined reference value, an instantaneous gradient value corresponding to a difference value between the first and second digital values, and an instantaneous deviation value corresponding to a difference value between an intermediate value between the first and second digital values and the reference value. An information conversion section converts, based on an inversely proportional conversion table, the instantaneous gradient value to an inversely proportional value. An arithmetic section detects an instantaneous variance value by multiplying the instantaneous deviation value and the inversely proportional value together, and squaring a value obtained by the multiplication, and detects an integrated value by accumulating the instantaneous variance value. A standard deviation detection section detects a square root of a mean value of the integrated value as the absolute jitter value.

6 Claims, 9 Drawing Sheets

OPTICAL DISC REPRODUCTION APPARATUS

CROSS-REFERENCE TO RELATED APPLICATION

This is a continuation of PCT International Application PCT/JP2009/006558 filed on Dec. 2, 2009, which claims priority to Japanese Patent Application No. 2009-089744 filed on Apr. 2, 2009. The disclosures of these applications including the specifications, the drawings, and the claims are hereby incorporated by reference in their entirety.

BACKGROUND

The present disclosure relates to an optical disc reproduction apparatus, and more particularly relates to a technique for detecting signal quality.

In optical disc reproduction apparatuses for reproducing an optical disc such as, a compact disc (CD), a digital versatile disc (DVD), a digital versatile disc-random access memory (DVD-RAM), and a Blu-ray disc (BD), it is required to detect signal quality of a reproduced signal for the purpose of optimizing and testing reproduction performance. International Publication No. WO2008/044503 Pamphlet describes an optical disc reproduction apparatus in which, in order to reduce a circuit area, a buffer circuit (e.g., a DRAM) which is necessary for each of demodulation of a reproduced signal and jitter detection (detection of jitter information to be used as an index of signal quality of a reproduced signal) is commonly used for both of the demodulation and the jitter detection, so that the demodulation and the jitter detection are both exclusively executed using a signal buffer circuit. Japanese Patent Publication No. 2006-252645 describes a technique for increasing jitter detection speed by simplifying jitter detection (e.g., decimation of a digital value, etc.).

SUMMARY

However, in the apparatus of International Publication No. WO2008/044503 Pamphlet, jitter information cannot be detected in parallel with demodulation of a reproduced signal. Therefore, signal quality of the reproduced signal cannot be evaluated under the same condition as that for demodulation. When demodulation speed and jitter detection speed are increased in order to execute demodulation and jitter detection in pseudo fashion at the same time (or in order to perform high speed reproduction), circuit size and power consumption are increased with the increase in speed of demodulation and jitter detection. If jitter detection is simplified to increase jitter detection speed, as in Japanese Patent Publication No. 2006-252645, accuracy of jitter information detection is reduced because of simplification of jitter detection. As described above, signal quality of a reproduced signal cannot be accurately detected in parallel with demodulation of the reproduced signal, and thus, it has been difficult to reduce a learning time (a time required for optimizing reproduction performance) and a test time (a time required for testing reproduction performance) of an optical disc reproduction apparatus.

It is therefore an object of the present disclosure to provide an optical disc reproduction apparatus which can accurately detect signal quality of a reproduced signal in parallel with demodulation of the reproduced signal.

According to one embodiment, an optical disc reproduction apparatus includes a signal reproduction circuit configured to reproduce a wireless frequency signal from an optical disc, and convert the wireless frequency signal to a digital signal including a plurality of digital values in synchronization with a predetermined sampling clock; a demodulation circuit configured to perform demodulation to the digital signal; and a jitter detection circuit configured to detect an absolute jitter value to be an index of signal quality of the digital signal in parallel with the demodulation by the demodulation circuit, and the jitter detection circuit includes an instantaneous jitter information detection section configured to detect, based on first and second digital values of the digital signal which indicate different polarities relative to a predetermined reference value, an instantaneous gradient value corresponding to a difference value between the first and second digital values, and an instantaneous deviation value corresponding to a difference value between an intermediate value between the first and second digital values and the reference value, an information conversion section configured to convert, based on an inversely proportional conversion table showing a correspondence relationship between the instantaneous gradient value and an inversely proportional value which is inversely proportional to the instantaneous gradient value, the instantaneous gradient value detected by the instantaneous jitter information detection section to the inversely proportional value, an arithmetic section configured to detect an instantaneous variance value by multiplying the instantaneous deviation value detected by the instantaneous jitter information detection section and the inversely proportional value obtained by the information conversion section together, and squaring a value obtained by the multiplication, and detect an integrated value by accumulating the instantaneous variance value, and a standard deviation detection section configured to detect a square root of a mean value of the integrated value as the absolute jitter value.

In the optical disc reproduction apparatus, demodulation and jitter detection are caused to be performed in separate systems, and the absolute jitter value (a value corresponding to the standard deviation value of a jitter) is detected as an index of signal quality of a reproduced signal (a digital signal), thereby allowing accurate detection of signal quality of the reproduced signal in parallel with demodulation of the reproduced signal. Also, increase in circuit size and power consumption due to increase in jitter detection speed can be reduced, as compared to a configuration in which a divider is used for calculating the instantaneous variance value.

Note that, since the correspondence relationship between the instantaneous gradient value and the sampling cycle and the correspondence relationship between the instantaneous deviation value and the fluctuation amount exhibit more linear characteristics, as the temporal distance between the first and second digital values reduces, the temporal distance between the first and second digital values preferably corresponds to one cycle of the sampling clock.

A bit width of the inversely proportional value obtained by the information conversion section may be different from a bit width of the instantaneous gradient value. For example, the accuracy of the absolute jitter value can be improved, as the bit width of the inversely proportional value is increased. Also, circuit size and power consumption of the arithmetic section can be reduced, as the bit width of the inversely proportional value is reduced.

The information conversion section may limit the inversely proportional value so that the inversely proportional value is smaller than a predetermined value. Thus, a processing load of the arithmetic section can be reduced, and the circuit size and power consumption of the arithmetic section can be reduced.

The instantaneous jitter information detection section may discern a rising edge at which the second digital value is larger than the first digital value, and a falling edge at which the second digital value is smaller than the first digital value, and detect the instantaneous gradient value and the instantaneous deviation value, when only one of the rising edge and the falling edge is generated. Thus, processing loads of the arithmetic section and the standard deviation detection section can be reduced.

The jitter detection circuit may further include an asynchronous transfer section provided between the arithmetic section and the standard deviation detection section, and configured to hold the integrated value detected by the arithmetic section with a timing corresponding to an operation of the arithmetic section, and transfer the held integrated value to the standard deviation detection section with a timing corresponding to the operation of the standard deviation detection section. Thus, garbled data and data leak in the standard deviation detection section can be prevented or reduced.

DETAILED DESCRIPTION

Figure 1:
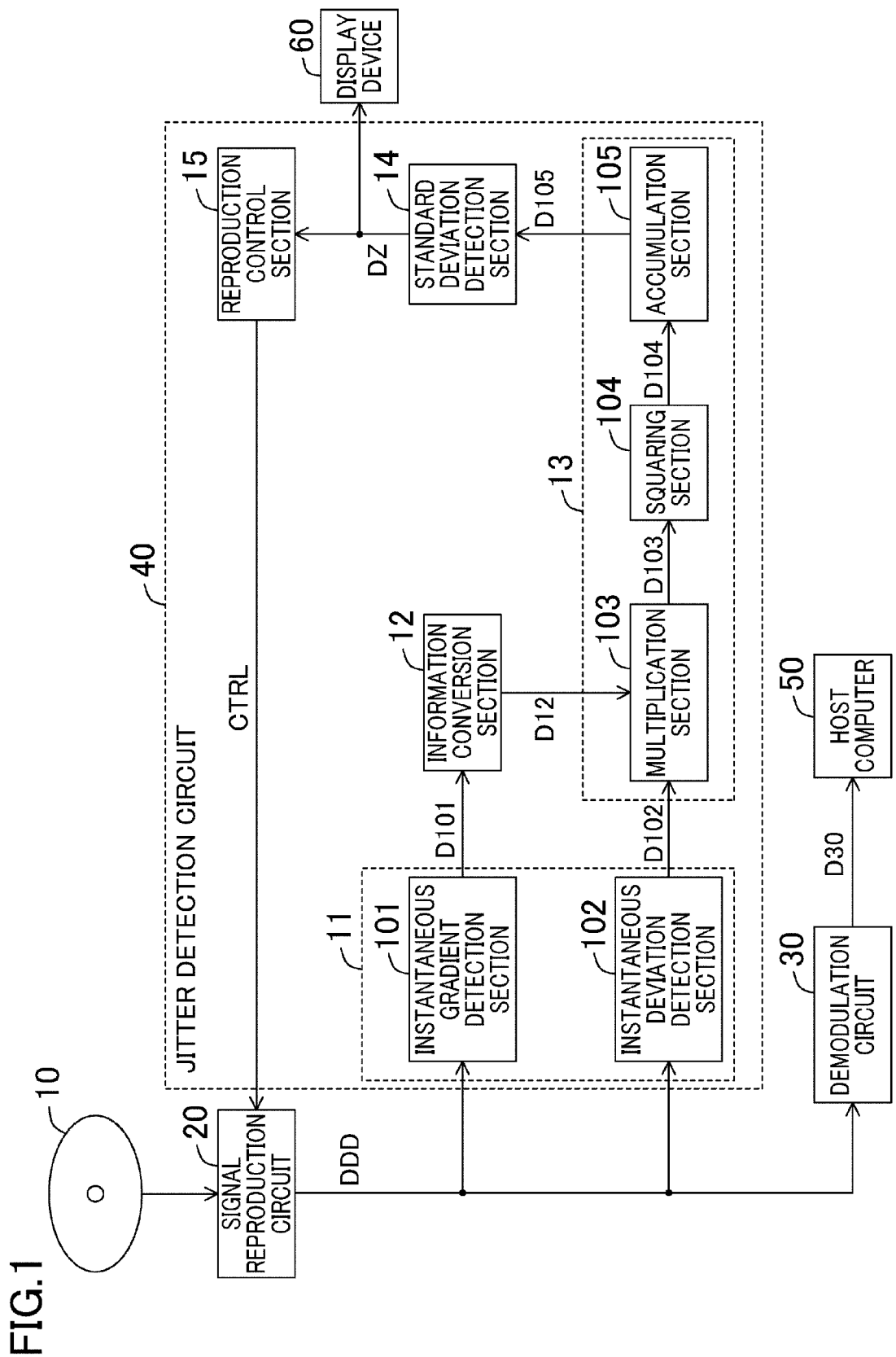
FIG. 1 is a diagram illustrating an example configuration of an optical disc reproduction apparatus.

Embodiments of the present disclosure will be described below in detail with reference to the accompanying drawings. Note that similar reference characters designate the same or similar elements in the drawings, and the explanation thereof is not repeated.

FIG. 1 illustrates an example configuration of an optical disc reproduction apparatus. The optical disc reproduction apparatus reproduces a digital signal DDD from an optical disc 10, and detects an absolute jitter value DZ to be an index of signal quality of the digital signal DDD as well as performing demodulation to the digital signal DDD. The optical disc reproduction apparatus includes a signal reproduction circuit 20, a demodulation circuit 30, and a jitter detection circuit 40.

[Optical Disc]

The optical disc 10 is a disc on which digital data (e.g., image data, and sound data, etc.) is recorded, and is, for example, a compact disc (CD), a digital versatile disc (DVD), a digital versatile disc-random access memory (DVD-RAM), and a Blu-ray disc (BD). When digital data is recorded on the optical disc 10, digital data to be recorded is converted to a recording signal to satisfy predetermined run-length limit constraints. For example, if the optical disc 10 is a DVD, digital data to be recorded may be converted to a recording code including at least three consecutive same codes by the 8-16 modulation, and then, converted to a recording signal (a recording signal whose minimal run-length is limited to 2 bits) by the non-return to zero invert (NRZI) modulation. If the optical disc 10 is a BD, digital data to be recorded may be converted to a recording code including at least two consecutive same codes by the (1, 7) RLL coding, and then, converted to a recording signal (a recording signal whose minimal run-length is limited to 1 bit). Based on such a recording signal, a recording film of the optical disc 10 is irradiated with an energy beam (e.g., laser), thereby a plurality recording marks are written helically on the recording film. Note that digital data may include parity data for error correction. In this case, digital data may be configured in error correcting code (ECC) block unit.

[Signal Reproduction Circuit and Demodulation Circuit]

Figure 2:
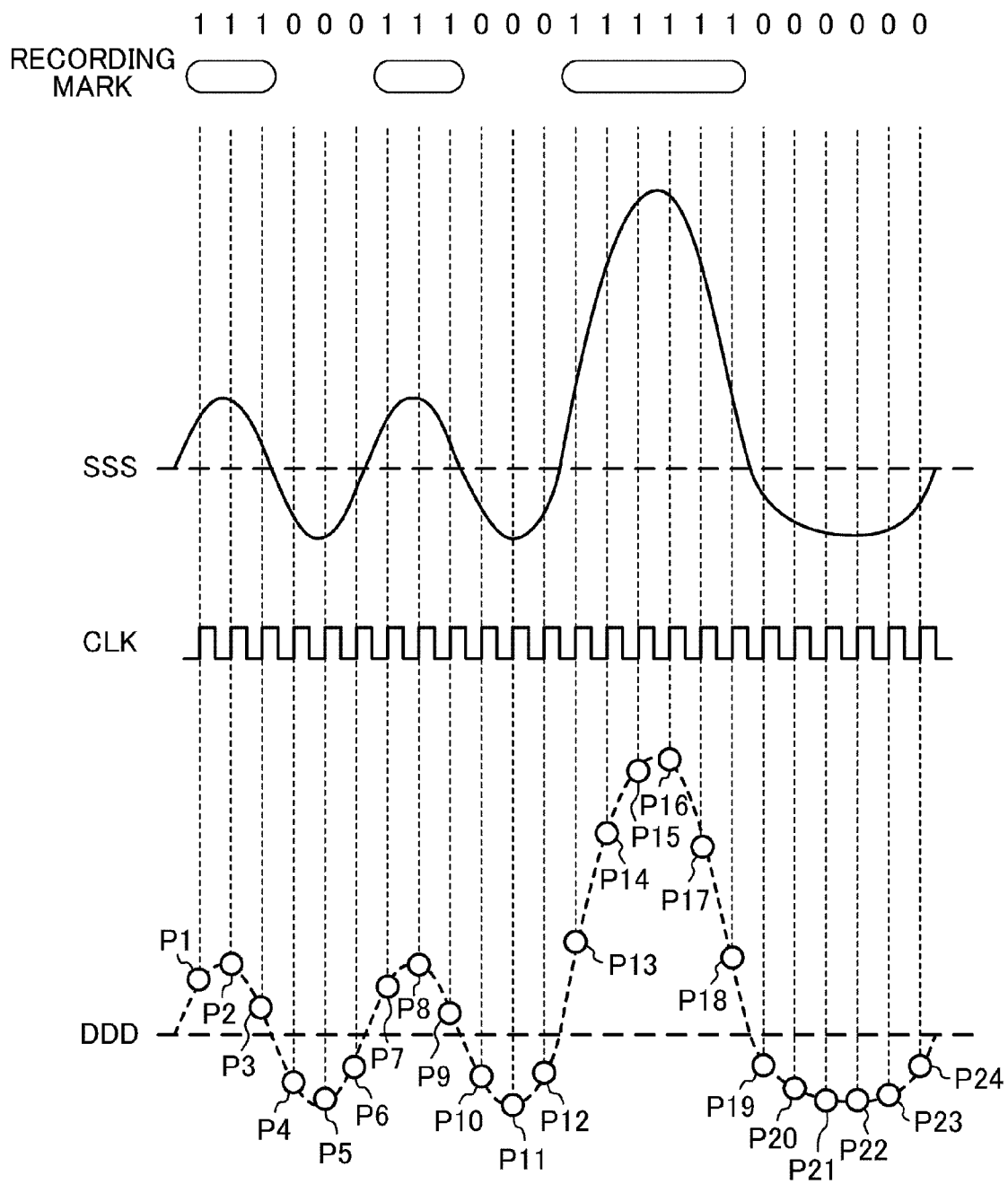
FIG. 2 is a chart describing an operation of a signal reproduction circuit of FIG. 1.

The signal reproduction circuit 20 reproduces a wireless frequency signal from the optical disc 10, and converts the wireless frequency signal to a digital signal DDD in synchronization with a predetermined sampling clock (e.g., a clock corresponding to a channel clock component of the wireless frequency signal). For example, as shown in FIG. 2, the signal reproduction circuit 20 reproduces a wireless frequency signal SSS corresponding to a recording state of the optical disc 10 by irradiating the optical disc 10 with an energy beam and receiving reflected light from the optical disc 10, and converts the wireless frequency signal SSS to the digital signal DDD including a plurality of digital values P1, P2, ... in synchronization with a sampling clock CLK. The demodulation circuit 30 performs demodulation to the digital signal DDD to generate demodulated data D30, and supplies the demodulated data D30 to a host computer 50 (e.g., a personal computer, a DVD recorder, and a DB recorder, etc.). Note that the demodulation circuit 30 may execute partial response maximum likelihood (PRML) signal processing as demodulation. The host computer 50 processes the demodulated data D30 (e.g., reproduces image and sound from the demodulated data D30).

[Jitter Detection Circuit]

The jitter detection circuit 40 detects an absolute jitter value DZ in parallel with demodulation by the demodulation circuit 30, and supplies the absolute jitter value DZ to a display device 60. The display device 60 displays the absolute jitter value DZ. Also, the jitter detection circuit 40 controls the signal reproduction circuit 20 according to the absolute jitter value DZ. The jitter detection circuit 40 includes an instantaneous jitter information detection section 11, an information conversion section 12, an arithmetic section 13, a standard deviation detection section 14, and a reproduction control section 15.

The instantaneous jitter information detection section 11 detects an instantaneous gradient value D101 and an instantaneous deviation value D102 based on two digital values (two digital values before and after a reference value) indicating different polarities relative to a predetermined reference value (e.g., zero level) of a plurality of digital values forming the digital signal DDD. The instantaneous gradient value D101 corresponds to a difference value between the two digital values before and after the reference value, and the instantaneous deviation value D102 corresponds to a difference value between an intermediate value (e.g., a mean value) between the two digital values before and after the reference value and the reference value. For example, the instantaneous jitter information detection section 11 sequentially obtains the plurality of digital values forming the digital signal DDD, and determines the polarity of each of the digital values relative to the reference value (whether the digital value is greater or smaller than the reference value). Then, if the polarity of the currently obtained digital value is different from the polarity of the previously obtained digital value (e.g., the digital value immediately before the currently obtained digital value), the instantaneous jitter information detection section 11 detects the instantaneous gradient value D101 and the instantaneous deviation value D102, based on the currently obtained digital value and the previously obtained digital value. The instantaneous jitter information detection section 11 may include an instantaneous gradient value detection section 101 configured to detect a difference value between the two digital values as the instantaneous gradient value D101, and an instantaneous deviation value detection section 102 configured to detect a difference value between the intermediate value between the two digital values and the reference value as the instantaneous deviation value D102.

Figure 3:
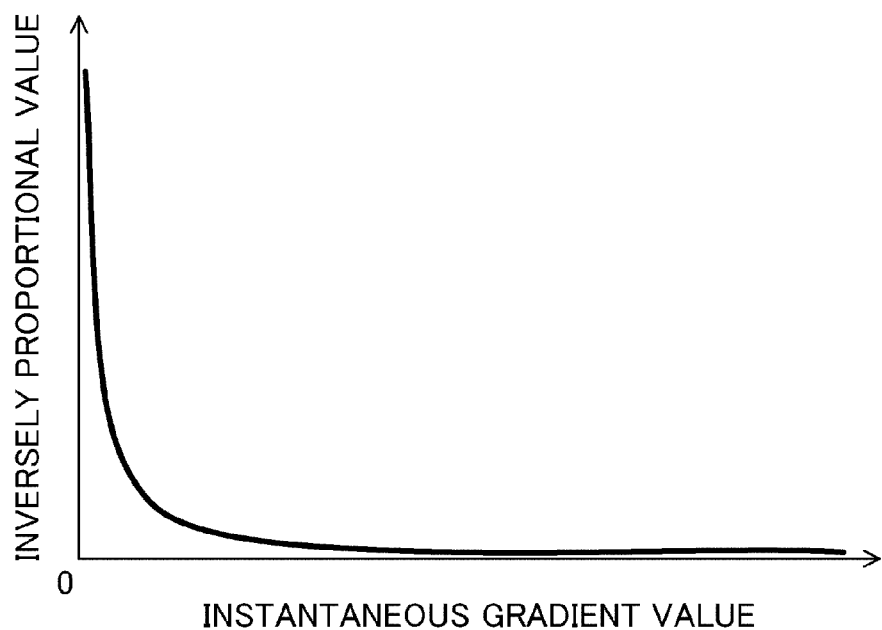
FIG. 3 is a graph describing an inversely proportional conversion table.

The information conversion section 12 includes an inversely proportional conversion table showing the correspondence relationship between the instantaneous gradient value and the inversely proportional value (the value inversely proportional to the instantaneous gradient value). In the inversely proportional conversion table, as shown in FIG. 3, a plurality of inversely proportional values are given for a plurality of the instantaneous gradient values in one-to-one correspondence. For example, the inversely proportional value is a reciprocal of the instantaneous gradient value. The information conversion section 12 converts the instantaneous gradient value D101 detected by the instantaneous jitter information detection section 11 to an inversely proportional value D12, based on the inversely proportional conversion table.

The arithmetic section 13 multiplies the instantaneous deviation value D102 detected by the instantaneous jitter information detection section 11 and the inversely proportional value D12 obtained by the information conversion section 12, and squares an value obtained by the multiplication, thereby detecting an instantaneous variance value D104. The arithmetic section 13 accumulates the instantaneous variance values D104 to detect an integrated value D105. For example, the arithmetic section 13 includes a multiplication section 103 configured to multiply the instantaneous deviation value D102 and the inversely proportional value D12 together to obtain a multiplied value D103, a squaring section 104 configured to square the multiplied value D103 to obtain the instantaneous variance value D104, and an accumulation section 105 configured to accumulate M instantaneous variance values D104 (where the accumulation number M is an integer equal to or greater than 2) to obtain the integrated value D105.

The standard deviation detection section 14 detects, as the absolute jitter value DZ, a square root of a mean value of the integrated value D105. For example, the standard deviation detection section 14 divides the integrated value D105 by the accumulation number M to obtain a divided value, and raises the divided value to the one-half power to obtain the absolute jitter value DZ. Note that the accumulation number M is preferably set to the nth power of 2 (where n is an integer equal to or greater than 1). Thus, the operation by the standard deviation detection section 14 can be simplified.

The reproduction control section 15 controls the signal reproduction circuit 20 so that the absolute jitter value DZ detected by the standard deviation detection section 14 is small. For example, the reproduction control section 15 outputs a control signal CTRL for controlling the signal reproduction circuit 20 to optimize focus position control (such as focus control and traffic control) for an energy beam in the signal reproduction circuit 20. Thus, distortion depending on the shape of the optical disc 10, and comatic aberration due to tangent tilt and radial tilt can be reduced, and signal quality of a reproduced signal can be improved. Note that the jitter detection circuit 40 does not have to include the reproduction control section 15.

Figure 4:
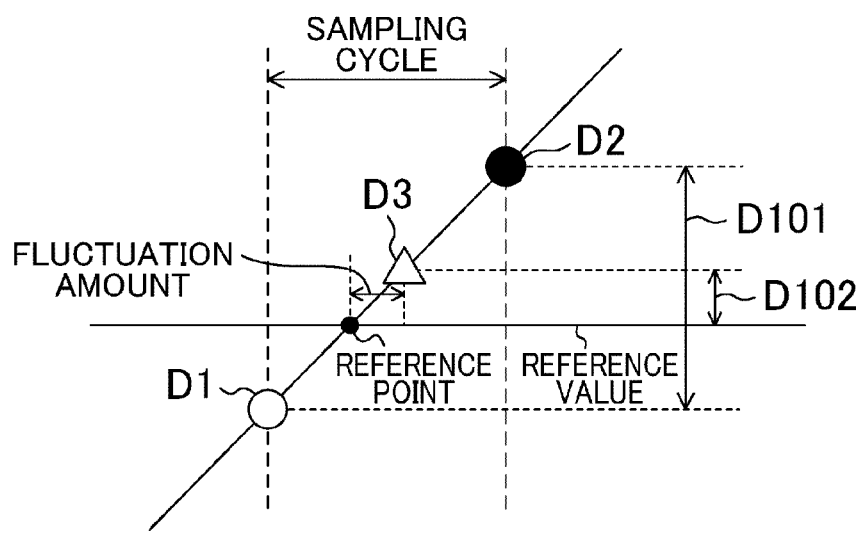
FIG. 4 is a graph describing instantaneous gradient value and instantaneous deviation value.

Next, the instantaneous gradient value D101 and the instantaneous deviation value D102 will be described with reference to FIG. 4. An example will be described hereinafter using digital values (e.g., digital values P6 and P7 of FIG. 2) around a reference value of a rising edge of the digital signal DDD.

A digital value D1 indicates a negative polarity relative to a reference value, and a digital value D2 indicates a positive polarity relative to the reference value. The instantaneous gradient value D101 corresponds to a difference value between the digital values D1 and D2, and the instantaneous deviation value D102 corresponds to a difference value between an intermediate value (a mean value D3 in this case) between the digital values D1 and D2 and the reference value. In this case, a time distance between the digital values D1 and D2 corresponds to a sampling cycle (one cycle of a sampling clock CLK). Assuming that the linearity of the digital signal DDD is maintained around the reference value, when the instantaneous gradient value D101 and the instantaneous deviation value D102 are projected onto a time axis, the instantaneous gradient value D101 corresponds to the sampling cycle, and the instantaneous deviation value D102 corresponds to the fluctuation amount of the digital signal DDD. The fluctuation amount corresponds to the amount of shift of a temporal position of the actual intermediate value D3 relative to a reference point (the temporal position of the intermediate value D3 when no jitter occurs). Note that for digital values (e.g., digital values P3 and P4 of FIG. 2) around a reference value of a falling edge of the digital signal DDD, when the linearity of the digital signal DDD is maintained around the reference value, the instantaneous gradient value D101 and the instantaneous deviation value D102 respectively correspond to the sampling cycle and the fluctuation amount.

Thus, the instantaneous gradient value D101 and the instantaneous deviation value D102 respectively correspond to the sampling cycle and the fluctuation amount. Therefore, the inversely proportional value D12 corresponds to a reciprocal of the sampling cycle, and the instantaneous variance D104 corresponds to ((the fluctuation amount)/(the sampling cycle))$^2$. That is, the absolute jitter value DZ which is a squire root of the mean value of the instantaneous variance D104 corresponds to a standard deviation value of a jitter of the digital signal DDD.

As described above, demodulation and jitter detection are caused to be performed in separate systems, and the absolute jitter value DZ (the standard deviation value) is detected as an index of a reproduced signal (the digital signal DDD), thereby allowing accurate detection of signal quality of the reproduced signal to be performed in parallel with demodulation of the reproduced signal. Thus, reproduction performance of the signal reproduction circuit 20 can be changed according to temporal fluctuations of the signal quality of the reproduced signal due to temperature drifts and recording quality fluctuations of the optical disc 10, and a learning time (a time required for optimizing the reproduction performance) of an optical disc reproduction apparatus can be reduced. Also, the signal quality of the reproduced signal can be accurately evaluated under the same condition as that for demodulation, and therefore, a test time of the optical disc reproduction apparatus (a time required for testing the reproduction performance), and a test time of the optical disc 10 (a time required for testing the recording quality of the optical disc 10) can be reduced.

When a divider for performing division for the instantaneous gradient value D101 and the instantaneous deviation value D102 to obtain the instantaneous variance D104 is used, circuit size and power consumption of the divider increase as the speed of division processing by the divider increases. However, in the optical disc reproduction apparatus of FIG. 1, division processing is realized using the inversely proportional conversion table, and therefore, increase in circuit size and power consumption with increase in jitter detection speed can be reduced. Furthermore, the circuit configuration of the jitter detection circuit 40 can be simplified, as compared to when the divider is used, and thus, the jitter detection circuit 40 can be simply designed. Therefore, a development time for the optical disc reproduction apparatus can be reduced.

[Temporal Distance between Digital Values]

A temporal difference between the digital values D1 and D2 may correspond to an integral multiple of the cycle of the sampling clock CLK. For example, the instantaneous gradient value D101 and the instantaneous deviation value D102 may be detected assuming the digital values P5 and P8 of FIG. 2 to be the digital values D1 and D2 (in this case, the temporal distance between the digital values D1 and D2 corresponds to three cycles of the sampling clock CLK). However, since the correspondence relationship between the instantaneous gradient value D101 and the sampling cycle and the correspondence relationship between the instantaneous deviation value D102 and the fluctuation amount exhibit more linear characteristics as the temporal distance between the digital values D1 and D2 reduces, the temporal distance between the digital values D1 and D2 preferably corresponds to the sampling cycle (one cycle of the sampling clock CLK).

[Variations of Instantaneous Jitter Information Detection Section]

The instantaneous jitter information detection section 11 may be configured to have an edge selection function. Specifically, the instantaneous jitter information detection section 11 may be configured to discern a rising edge of the digital signal DDD (e.g., a transition from the digital value P6 to the digital value P7 of FIG. 2) and a falling edge of the digital signal DDD (e.g., a transition from the digital value P3 to the digital value P4 of FIG. 2) and detect, when only one of the rising edge and the falling edge is generated, the instantaneous gradient value D101 and the instantaneous deviation value D102. By forming the instantaneous jitter information detection section 11 with the above-described configuration, processing loads of the arithmetic section 13 and the standard deviation detection section 14 can be reduced. Also, it is allowed to discern whether degradation of quality of the reproduced signal is caused by incompatibility of reproduction performance of an optical disc reproduction apparatus (e.g., a tangent tilt) or reduction in recording quality of the optical disc 10. For example, when a tangent tilt is generated, a signal waveform of the digital signal DDD is asymmetric on the time axis (i.e., the rising edge and the falling edge of the digital signal DDD have different gradient values). In this case, the absolute jitter value DZ corresponding to the rising edge and the absolute jitter value DZ corresponding to the falling edge are separately detected, and the two absolute jitter values DZ are compared to each other, thereby estimating whether degradation of the quality of the reproduced signal is caused by a tangent tilt or not.

[Variations of Information Conversion Section]

The inversely proportional value D12 may be a value (a multiplied reciprocal value) obtained by multiplying a reciprocal of the instantaneous gradient value D101 by a predetermined value (a positive real number). For example, in the inversely proportional conversion table, multiplied reciprocal values may be given to correspond respectively to a plurality of instantaneous gradient values. The bit width of the inversely proportional value D12 may be different from the bit width of the instantaneous gradient value D101. For example, the instantaneous gradient value and the inversely proportional value may be set to have different bit widths in the inversely proportional conversion table. As another option, the information conversion section 12 may be configured to perform a bit shift of the inversely proportional value D12 obtained based on the inversely proportional conversion table to change the bit width of the information conversion section 12. In this case, the information conversion section 12 multiplies the inversely proportional value D12 by $2^n$ (where n is an integer equal to or greater than 1). As the bit width of the inversely proportional value D12 is increased, the accuracy of the absolute jitter value DZ can be improved. Also, as the bit width of the inversely proportional value D12 is reduced, the circuit size and power consumption of the arithmetic section 13 can be reduced. Note that the bit width of the inversely proportional value D12 may be set according to the reproduction performance of the optical disc reproduction apparatus and the type of the optical disc 10. For example, since a BD has a higher recording density than that of a CD and it is highly possible that signal quality is degraded, when the optical disc 10 is a BD, the bit width of the inversely proportional value D12 may be set greater than that when the optical disc 10 is a CD. As described above, processing loads of the arithmetic section 13 and the standard deviation detection section 14 can be properly set by setting the bit width according to the type of the optical disc 10.

The information conversion section 12 may be configured to change the bit width of the inversely proportional value D12 according to external control. For example, the information conversion section 12 may change the bit shift amount of the inversely proportional value D12 according to the external control. Note that the bit width of the inversely proportional value D12 may be changed according to the reproduction performance of the optical disc reproduction apparatus and the type of the optical disc 10.

Figure 5:
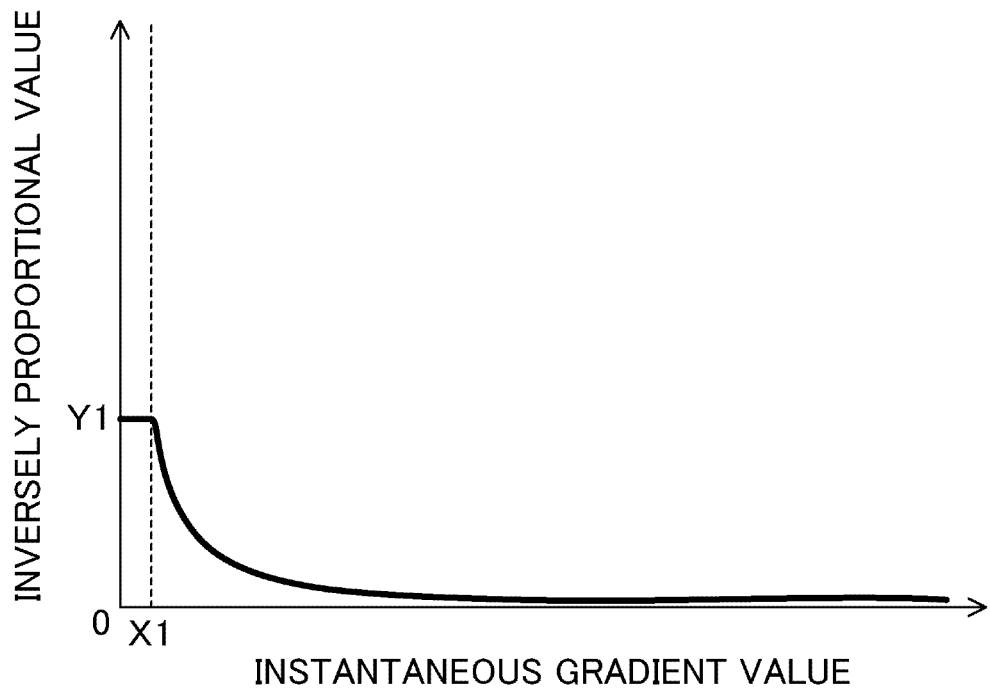
FIG. 5 is a graph describing a variation of an inversely proportional conversion table.

Furthermore, the information conversion section 12 may be configured to have a clip control function. That is, the information conversion section 12 may be configured to limit the inversely proportional value D12 to be smaller than a predetermined value Y1 (e.g., an inversely proportional value corresponding to a threshold X1 of the instantaneous gradient value D101). For example, the information conversion section 12 may be configured to convert the instantaneous gradient value D101 to the inversely proportional value D12 based on an inversely proportional conversion table having the correspondence relationship shown in FIG. 3, and output, when the inversely proportional value D12 is greater than the predetermined value Y1, the predetermined value Y1 as the inversely proportional value D12. Also, the information conversion section 12 may be configured to convert the instantaneous gradient value D101 to the inversely proportional value D12 based on an inversely proportional conversion table having the correspondence relationship shown in FIG. 5. In this inversely proportional conversion table, the predetermined value Y1 is given for each instantaneous gradient value smaller than the threshold X1 so as to correspond thereto. By limiting the inversely proportional value D12 in the above-described manner, the processing load of the arithmetic section 13 can be reduced, and the circuit size and power consumption of the arithmetic section 13 can be reduced. As the frequency of the wireless frequency signal SSS increases, the amplitude and gradient value amount (an increase/decrease amount) of the wireless frequency signal SSS reduce, and it becomes more difficult to distinguish a signal component and the noise component from each other. For example, when the optical disc 10 is a BD, it is difficult to distinguish a signal component of the wireless frequency signal SSS which corresponds to a smallest recording mark from a noise component. That is, as the instantaneous gradient value D101 reduces, reliability as instantaneous jitter information reduces. Therefore, by limiting the inversely proportional value D12, the instantaneous gradient value D101 with low reliability can be removed, and the accuracy of the absolute jitter value DZ can be improved.

[Asynchronous Transfer Section]

Figure 6:
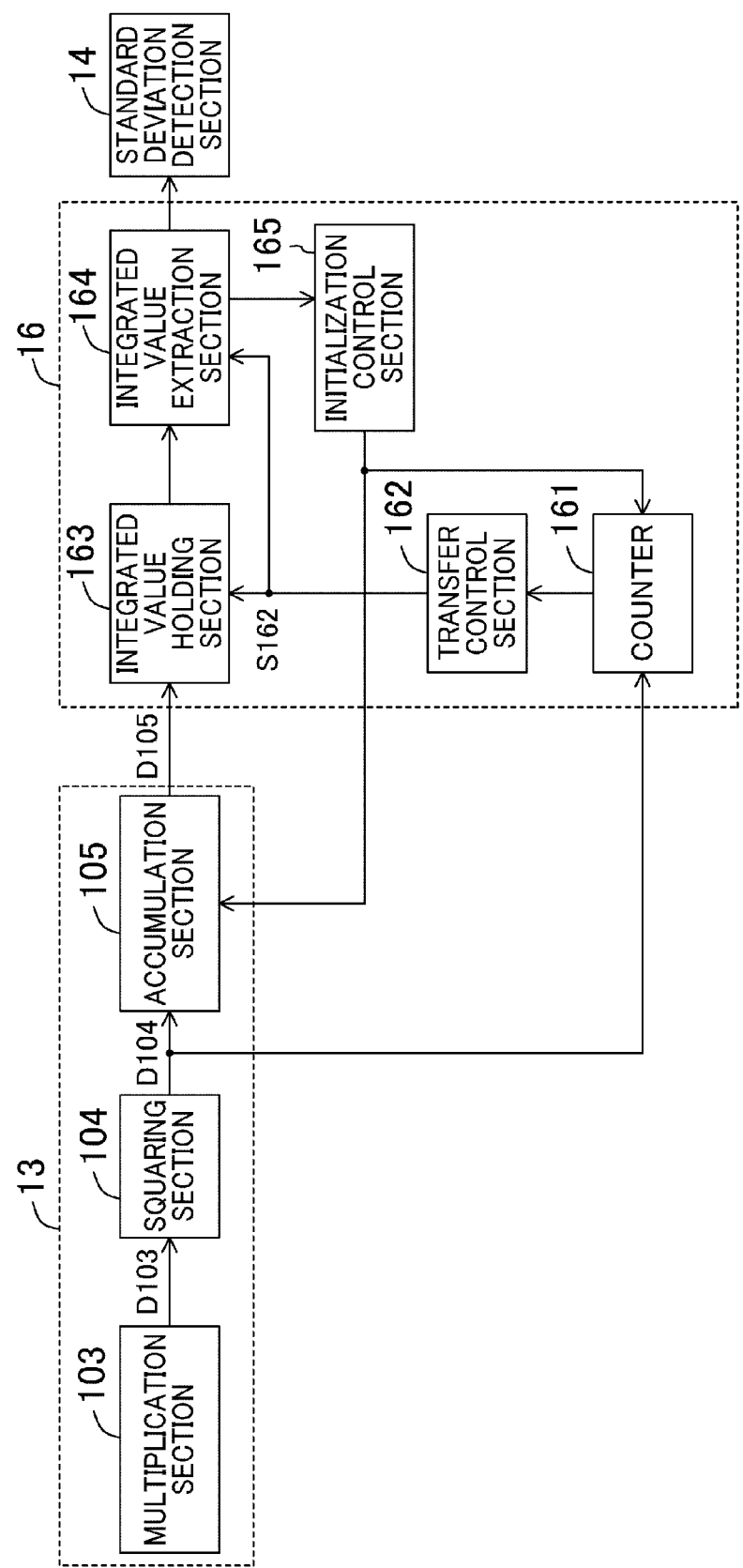
FIG. 6 is a diagram illustrating an asynchronous transfer section.

In the jitter detection circuit 40, the arithmetic section 13 and the standard deviation detection section 14 may be synchronous with each other, and may be asynchronous with each other. For example, the instantaneous jitter information detection section 11, the information conversion section 12, and the arithmetic section 13 may be realized by a dedicated circuit (hardware), and the standard deviation detection section 14 and the reproduction control section 15 may be realized by a CPU (program). When the arithmetic section 13 and the standard deviation detection section 14 are asynchronous with each other, the jitter detection circuit 40 may further include an asynchronous transfer section 16 shown in FIG. 6. The asynchronous transfer section 16 holds the integrated value D105 detected by the arithmetic section 13 with a timing corresponding to the operation of the arithmetic section 13, and transfers the held integrated value D105 to the standard deviation detection section 14 with a timing corresponding to the operation of the standard deviation detection section 14. For example, the asynchronous transfer section 16 includes a counter 161, a transfer control section 162, an integrated value holding section 163, an integrated value extraction section 164, and an initialization control section 165.

The counter 161 counts the number of instantaneous variances D104 calculated by a squaring section 104. When a count value of the counter 161 has reached a predetermined value (e.g., the accumulation number M), the transfer control section 162 outputs an enabling signal S162. In response to the enabling signal S162 from the transfer control section 162, the integrated value holding section 163 holds the integrated value D105 obtained by the accumulation section 105. After the enabling signal S162 is output, the integrated value extraction section 164 extracts the integrated value held by the integrated value holding section 163 and transfers the extracted integrated value to the standard deviation detection section 14 with a timing corresponding to the operation of the standard deviation detection section 14. In this case, the integrated value held by the integrated value holding section 163 may be transferred collectively, and may be transferred in a predetermined unit (e.g., in a frame unit, and a ECC block unit, etc.). After the transfer of the integrated value by the integrated value extraction section 164 is completed, the initialization control section 165 initializes the integrated value D105 of the accumulation section 105 and the count value of the counter 161 (e.g., to set the integrated value D105 and the count value to zero). With the above-described configuration, garbled data and data leak in the standard deviation detection section 14 can be prevented or reduced, even when the arithmetic section 13 and the standard deviation detection section 14 are asynchronous with each other. Thus, the absolute jitter value DZ can be detected with high security and high efficiency.

[Other Configurations]

Next, the signal reproduction circuit 20 and the demodulation circuit 30 of FIG. 1 will be described in detail with reference to FIGS. 7-13.

Figure 7:
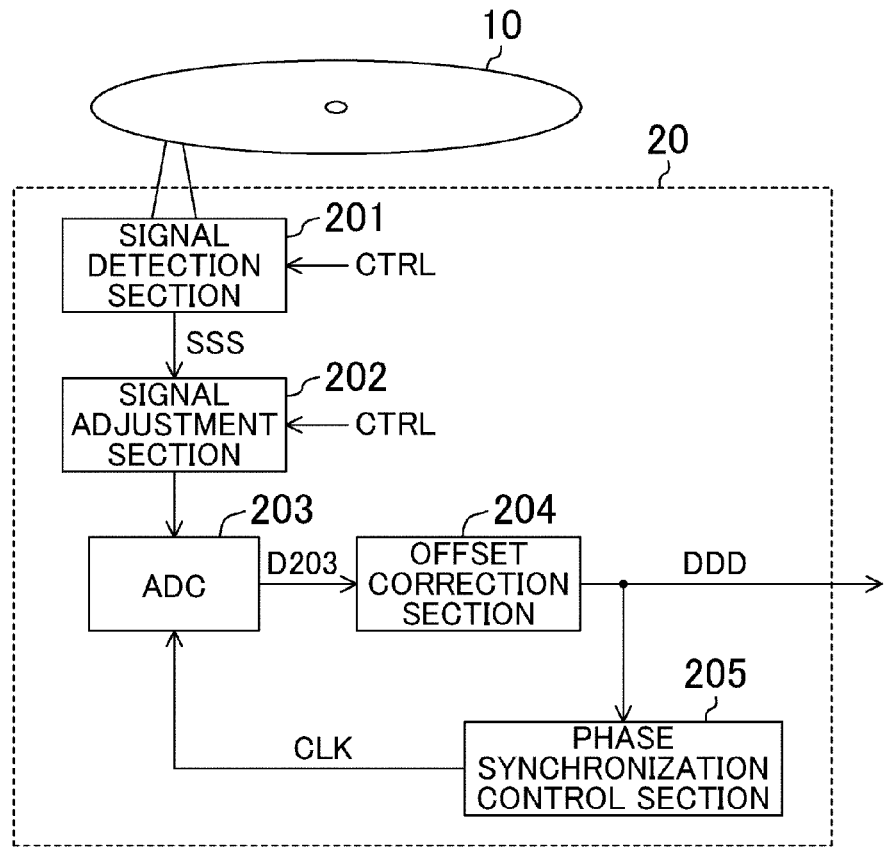
FIG. 7 is a diagram illustrating an example configuration of a signal reproduction circuit shown in FIG. 1.
Figure 8:
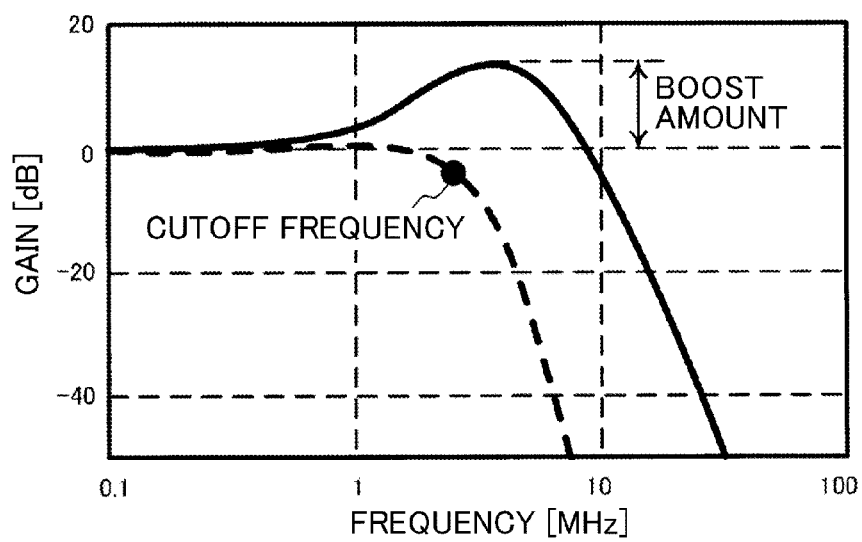
FIG. 8 is a graph describing frequency characteristics of a signal adjustment section shown in FIG. 7.

FIG. 7 illustrates an example configuration of the signal reproduction circuit 20 of FIG. 1. The signal reproduction circuit 20 includes a signal detection section 201, a signal adjustment section 202, an analog-to-digital converter (ADC) 203, an offset correction section 204, and a phase synchronization control section 205.

The signal detection section 201 includes a light source configured to irradiate the optical disc 10 with an energy beam, and a light detection section configured to receive a reflected light from the optical disc 10 and output the wireless frequency signal SSS according to the intensity of the reflected light. The signal detection section 201 may have a focus servo function for adjusting a focus position of the energy beam in response to the control signal CTRL form the reproduction control section 15, and a tracking servo function for adjusting a tracking position in response to the control signal CTRL.

The signal adjustment section 202 executes waveform equalization (i.e., processing of amplifying a high frequency component of the wireless frequency signal SSS and attenuating a noise component of the wireless frequency signal SSS). The cutoff frequency and the amount of a boost of the high frequency component in the signal adjustment section 202 may be variable according to the control signal CTRL from the reproduction control section 15. For example, the signal adjustment section 202 may be a high-order equal ripple filter having a frequency characteristic shown (by the solid line) in FIG. 8. Note that a frequency characteristic shown by the dashed line in FIG. 8 corresponds to the frequency characteristic of the high-order equal ripple filter when a boost of the high frequency component is not performed. The signal reproduction circuit 20 may include a finite impulse response (FIR) filter for performing waveform equalization, instead of the signal adjustment section 202, in a subsequent stage of the analog-to-digital converter 203.

The analog-to-digital converter 203 coverts the wireless frequency signal SSS processed by the signal adjustment section 202 to a digital signal D203 in synchronization with the sampling clock CLK. The offset correction section 204 adjusts an offset component of the digital signal D203 in an amplitude direction thereof so that the offset component of the digital signal D203 in the amplitude direction corresponds to the reference value (e.g., to the zero level), and outputs the adjusted digital signal D203 as the digital signal DDD. The phase synchronization control section 205 controls the frequency of the sampling clock CLK based on a phase error of the digital signal DDD relative to a desired clock (e.g., a clock having a frequency equal to a channel bit frequency of digital data recorded on the optical disc 10 or an integral multiple of the channel bit frequency) so that the phase error of the digital signal DDD is zero. Specifically, when a digital signal processing method such as PRML signal processing is employed to the demodulation circuit 30, it is important to synchronize the sampling clock CLK with the channel clock component of the wireless frequency signal SSS.

Figure 9:
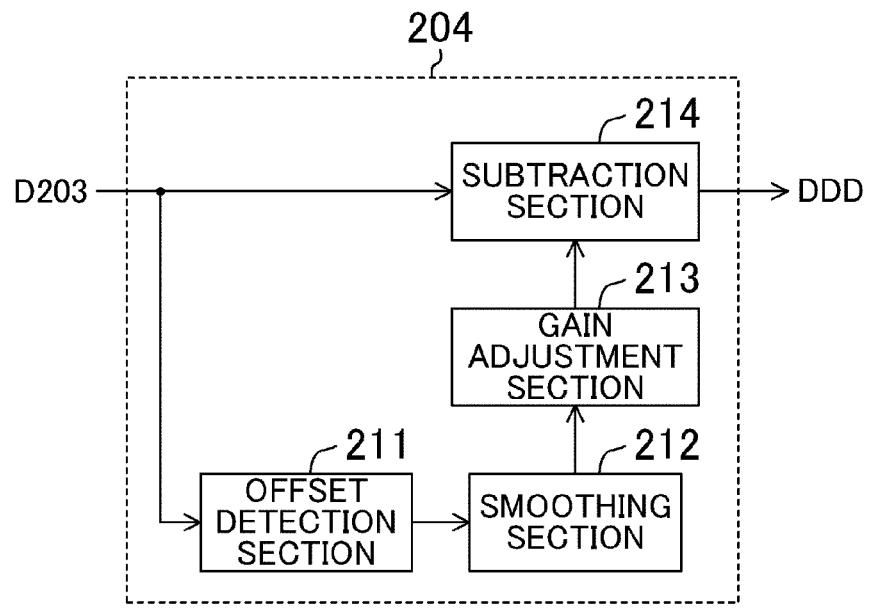
FIG. 9 is a diagram illustrating an example configuration of an offset correction section shown in FIG. 7.
Figure 10:
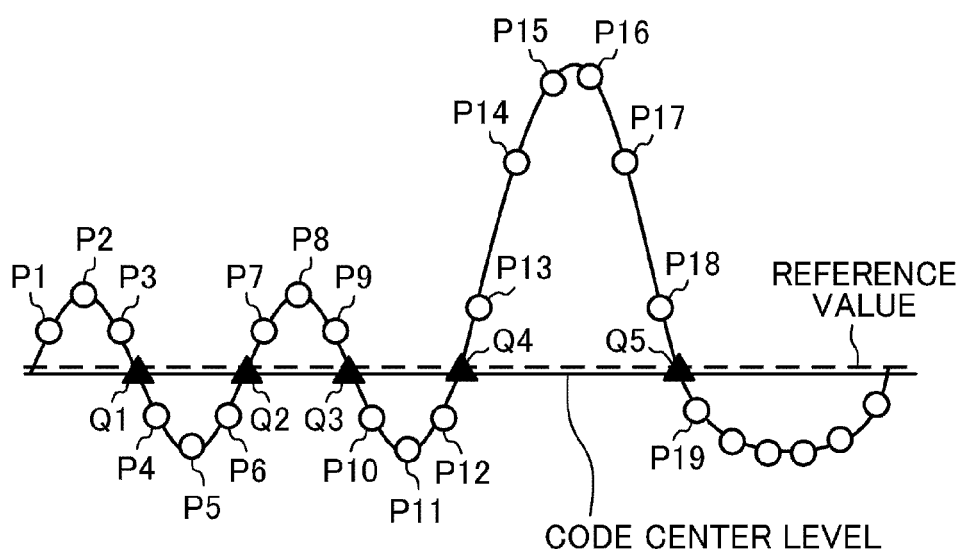
FIG. 10 is a diagram describing offset detection.

FIG. 9 illustrates an example configuration of the offset correction section 204 of FIG. 7. The offset correction section 204 includes an offset detection section 211, a smoothing section 212, a gain adjustment section 213, and a subtraction section 214. As shown in FIG. 10, the offset detection section 211 sequentially obtains a plurality of digital values P1, P2, . . . , determines the polarity of each of the digital values relative to a reference value (e.g., the zero level), and outputs, when the polarity of a currently obtained digital value (e.g., the digital value P4) is different from the polarity of a previously obtained digital value (e.g., the digital value P3), a mean value (e.g., the mean value Q1) of the currently obtained digital value and the previously obtained digital value, as an offset value. Similarly, the offset detection section 211 outputs, as the offset values, a mean value Q2 of the digital values P6 and P7, a mean value Q3 of the digital values P9 and P10, a mean value Q4 of the digital values P12 and P13, and a mean value Q5 of the digital values P18 and P19. The smoothing section 212 smoothes an output of the offset detection section 211. Thus, the smoothing section 212 outputs a signal indicating a code center level of the digital signal D203. The gain adjustment section 213 amplifies or attenuates an output of the smoothing section 212 according to a response characteristic for the purpose of offset correction. The subtraction section 214 subtracts an output of the gain adjustment section 213 from the digital signal D203.

Figure 11:
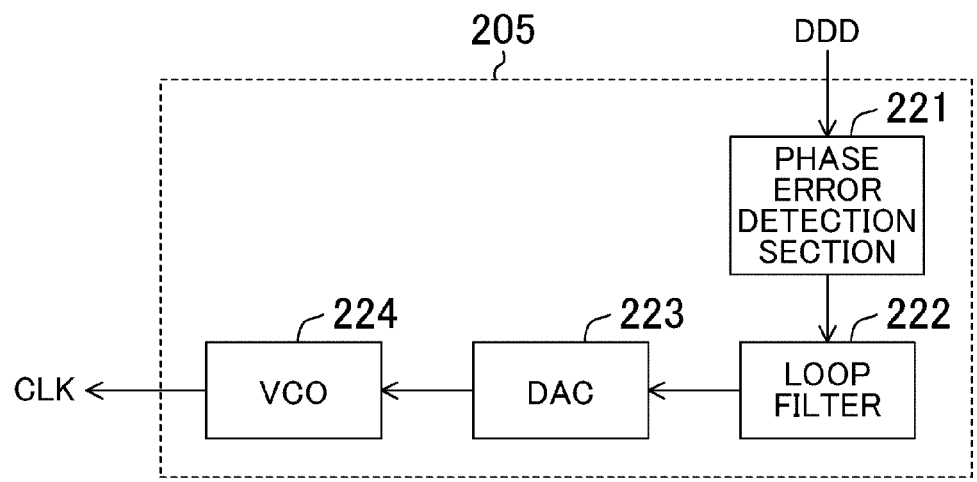
FIG. 11 is a diagram illustrating an example configuration of a phase synchronization control section shown in FIG. 7.
Figure 12:
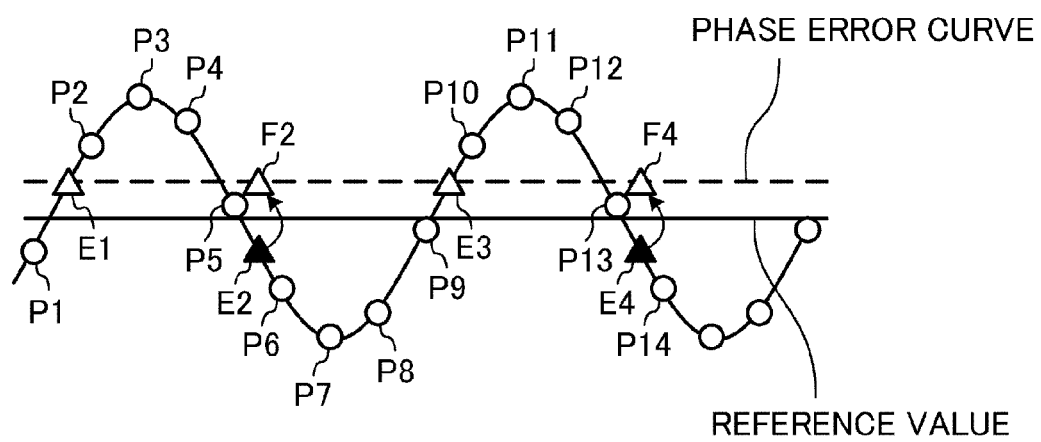
FIG. 12 is a diagram describing phase error detection.

FIG. 11 illustrates an example configuration of the phase synchronization control section 205 of FIG. 7. The phase synchronization control section 205 includes a phase error detection section 221, a loop filter 222, a digital-to-analog converter (DAC) 223, and a voltage control oscillator (VCO) 224. As shown in FIG. 12, the phase error detection section 221 sequentially obtains the plurality of digital values P1, P2, . . . , determines respective polarities of the digital values relative to the reference value (e.g., the zero level), and detects, when the polarity of a currently obtained digital value (e.g., the digital value P2) is different from the polarity of a previously obtained digital value (e.g., the digital value P1), a mean value (e.g., a mean value E1) of the currently obtained digital value and the previously obtained digital value. Then, when the currently obtained digital value is greater than the previously obtained digital value, the phase error detection section 221 outputs, as a phase error value, a mean value (e.g., the mean value E1, a mean value E3 of the digital values P9 and P10). When the currently obtained digital value is smaller than the previously obtained digital value, the phase error detection section 221 inverts a code of the mean value (e.g., a mean value E2 of the digital values P5 and P6, a mean value E4 of the digital values P13 and P14), and outputs an inverted value (e.g., an inverted value F2, F4) as the phase error value. The loop filter 222 smoothes an output of the phase error detection section 221. Thus, the loop filter 222 outputs a signal exhibiting a phase error curve of the digital signal DDD. The digital-to-analog converter 223 converts an output of the loop filter 222 to a control signal (an analog signal). The voltage control oscillator 224 adjusts the frequency of the sampling clock CLK according to the voltage level of the control signal from the digital-to-analog converter 223. For example, in FIG. 12, the output of the loop filter 222 (i.e., the phase error curve) indicates the positive polarity relative to the reference value, and therefore, the voltage control oscillator 224 increases the frequency the sampling clock CLK.

Figure 13:
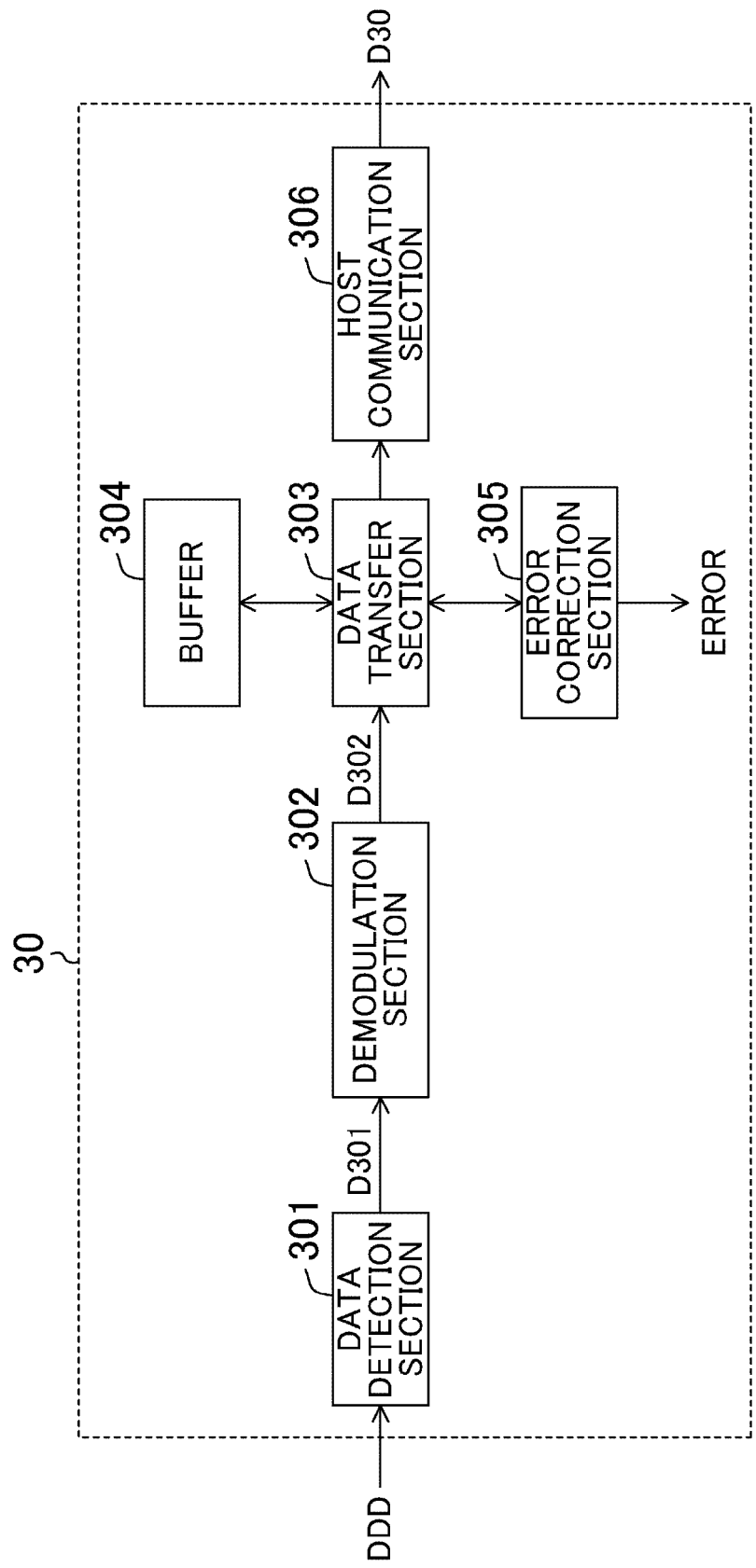
FIG. 13 is a diagram illustrating an example configuration of a demodulation circuit shown in FIG. 1.

FIG. 13 illustrates an example configuration of the demodulation circuit 30 of FIG. 1. The demodulation circuit 30 includes a data detection section 301, a demodulation section 302, a data transfer section 303, a buffer section 304, an error correction section 305, and a host communication section 306.

The data detection section 301 converts the digital signal DDD to a binary signal D301 (e.g., a recording signal). For example, the data detection section 301 sequentially obtains a plurality of digital values forming the digital signal DDD, determines the polarity of each of the digital values relative to a threshold level (e.g., the zero level), outputs a bit value of "1" when the digital value exhibits the positive polarity, and outputs a bit value of "0" when the digital value exhibits the negative polarity. Note that the data detection section 301 may convert the digital signal DDD to a binary signal D301 by a digital signal processing method such as PRML signal processing.

The demodulation section 302 performs demodulation to the binary signal D301 obtained by the data detection section 301 and outputs a demodulated data D302. For example, when the optical disc 10 is a DVD, the demodulation section 302 converts the binary signal D301 to a recording code by the NRZI demodulation, and then, converts the recording code to the demodulated data D302 by the 8-16 demodulation. When the optical disc 10 is a BD, the demodulation section 302 converts the binary signal D301 to a recording code by the NRZI demodulation, and then, converts the recording code to the demodulated data D302 by the (1, 7) RLL decoding.

The data transfer section 303 stores the demodulated data D302 obtained by the demodulation section 302 in the buffer section 304. For example, the buffer section 304 is comprised of a dynamic random access memory (DRAM). The data transfer section 303 transfers the demodulated data D302 stored in the buffer section 304 to the error correction section 305 in a predetermined unit (e.g., an ECC block unit). The error correction section 305 corrects a wrong bit value(s) in the demodulated data D302 to a right bit value(s) according to a predetermined error correction method (e.g., a Reed-Solomon scheme). The error correction section 305 may supply error rate information ERROR indicating an error rate (the ratio of an error correction bit number to a bit number of an ECC block) of demodulated data to the reproduction control section 15 (FIG. 1). In this case, the reproduction control section 15 may control the signal reproduction circuit 20 with reference to the error rate information ERROR, in addition to the absolute jitter value DZ. The data transfer section 303 transfers the demodulated data D302 which has been subjected to error correction by the error correction section 305 to the buffer section 304.

Furthermore, the data transfer section 303 transfers the demodulated data D302 which is error-corrected and stored in the buffer section 304 to the host communication section 306. The host communication section 306 transmits, as demodulated data D30, the error-corrected demodulated data from the data transfer section 303 to the host computer 50 in a manner based on an interface standard (e.g., parallel advanced technology attachment (parallel ATA), and serial ATA, etc.) determined between the optical disc reproduction apparatus and the host computer 50.

As has been described, the above-described optical disc reproduction apparatus can perform accuracy detection of signal quality of a reproduced signal in parallel with demodulation of the reproduced signal, and therefore, is useful as an optical disc drive, etc. used in electrical equipments (e.g., a digital handycam movie, and a note-type personal computer, etc.).

Note that the foregoing embodiments have been set forth merely for purposes of preferred examples in nature, and are not intended to limit the scope, applications, and use of the invention.

What is claimed is:

1. An optical disc reproduction apparatus, comprising:
a signal reproduction circuit configured to reproduce a wireless frequency signal from an optical disc, and convert the wireless frequency signal to a digital signal including a plurality of digital values in synchronization with a predetermined sampling clock;
a demodulation circuit configured to perform demodulation to the digital signal; and
a jitter detection circuit configured to detect an absolute jitter value to be an index of signal quality of the digital signal in parallel with the demodulation by the demodulation circuit,
wherein the jitter detection circuit includes
an instantaneous jitter information detection section configured to detect, based on first and second digital values of the digital signal which indicate different polarities relative to a predetermined reference value, an instantaneous gradient value corresponding to a difference value between the first and second digital values, and an instantaneous deviation value corresponding to a difference value between an intermediate value between the first and second digital values and the reference value,
an information conversion section configured to convert, based on an inversely proportional conversion table showing a correspondence relationship between the instantaneous gradient value and an inversely proportional value which is inversely proportional to the instantaneous gradient value, the instantaneous gradient value detected by the instantaneous jitter information detection section to the inversely proportional value,
an arithmetic section configured to detect an instantaneous variance value by multiplying the instantaneous deviation value detected by the instantaneous jitter information detection section and the inversely proportional value obtained by the information conversion section together, and squaring a value obtained by the multiplication, and detect an integrated value by accumulating the instantaneous variance value, and
a standard deviation detection section configured to detect a square root of a mean value of the integrated value as the absolute jitter value, and
the information conversion section limits the inversely proportional value so that the inversely proportional value is smaller than a predetermined value.

2. The optical disc reproduction apparatus of claim 1, wherein a time distance between the first digital value and the second digital value corresponds to one cycle of the sampling clock.

3. The optical disc reproduction apparatus of claim 1, wherein a bit width of the inversely proportional value obtained by the information conversion section is different from a bit width of the instantaneous gradient value.

4. The optical disc reproduction apparatus of claim 1, wherein the instantaneous jitter information detection section discerns a rising edge at which the second digital value is larger than the first digital value, and a falling edge at which the second digital value is smaller than the first digital value, and detects the instantaneous gradient value and the instantaneous deviation value, when only one of the rising edge and the falling edge is generated.

5. The optical disc reproduction apparatus of claim 1, wherein the jitter detection circuit further includes an asynchronous transfer section provided between the arithmetic section and the standard deviation detection section, and configured to hold the integrated value detected by the arithmetic section with a timing corresponding to an operation of the arithmetic section, and transfer the held integrated value to the standard deviation detection section with a timing corresponding to the operation of the standard deviation detection section.

6. The optical disc reproduction apparatus of claim 1, wherein the optical disc is any one of a CD, a DVD, a DVD-RAM, and a BD.

* * * * *